(12) United States Patent
Todorox

(10) Patent No.: US 7,046,131 B2
(45) Date of Patent: May 16, 2006

(54) DISPLAY METHOD AND APPARATUS

(75) Inventor: William Todorox, Mississauga (CA)

(73) Assignee: William Todorov, Mississauga (CA)

( * ) Notice: Subject to any disclaimer, the term of this patent is extended or adjusted under 35 U.S.C. 154(b) by 108 days.

(21) Appl. No.: 10/712,302

(22) Filed: Nov. 14, 2003

(65) Prior Publication Data
US 2005/0104738 A1 May 19, 2005

(51) Int. Cl.
B60C 23/00 (2006.01)
(52) U.S. Cl. .............. 340/444; 340/426.33; 340/815.4; 340/332; 362/600; 40/587
(58) Field of Classification Search .......... 340/426.33, 340/444, 691.1, 539.1, 332, 815.4; 362/459, 362/600; 40/587, 606.02; 116/56
See application file for complete search history.

(56) References Cited

U.S. PATENT DOCUMENTS

| 5,548,274 | A | | 8/1996 | Anderson et al. |
| 5,552,972 | A | * | 9/1996 | Rezvani ....................... 362/500 |
| 5,800,039 | A | * | 9/1998 | Lee ............................ 362/473 |
| 5,903,224 | A | * | 5/1999 | Reynolds ................ 340/815.45 |
| 6,030,106 | A | * | 2/2000 | Johnson ....................... 362/500 |
| 6,072,386 | A | | 6/2000 | Yu |
| 6,175,196 | B1 | * | 1/2001 | Ragner et al. .......... 315/200 A |
| 6,382,820 | B1 | * | 5/2002 | Chung ......................... 362/500 |
| 6,466,887 | B1 | * | 10/2002 | Weinbrenner ............... 702/141 |
| 6,485,169 | B1 | | 11/2002 | Ragner |
| 6,492,963 | B1 | * | 12/2002 | Hoch ........................... 345/39 |
| 6,530,683 | B1 | | 3/2003 | Ohkohdo et al. |
| 6,572,251 | B1 | | 6/2003 | Huang |
| 6,641,041 | B1 | * | 11/2003 | Olds et al. ................... 235/454 |
| 2003/0042310 | A1 | | 3/2003 | Olds et al. |

* cited by examiner

Primary Examiner—Daryl C Pope
(74) Attorney, Agent, or Firm—Bereskin & Parr

(57) ABSTRACT

A display apparatus is for mounting on a rotatable object. The display apparatus comprises: (a) a display array for displaying at least one display pattern; (b) a self-contained rotational speed sensor for sensing a rotational speed of the rotatable object, the self-contained rotational speed sensor being entirely mounted on the rotatable object; (c) a wireless receiver for receiving information from a signal source spaced from the rotatable object and, (d) a microprocessor for controlling the display array based on the rotational speed of the rotatable object to display the at least one display pattern using persistence of vision of a viewer.

9 Claims, 4 Drawing Sheets

DISPLAY METHOD AND APPARATUS

FIELD OF THE INVENTION

The present invention relates generally to devices for displaying information or images, and more particularly relates to a display apparatus for producing a displayed image on the tire of a vehicle by timing the display of the image to correspond to a particular position of the wheel and relying on the persistence of vision of a viewer.

BACKGROUND OF THE INVENTION

Prior art technologies for displaying images on the wheels of vehicles have been developed. For example, U.S. patent application Ser. No. 20030042310 discloses a tire flasher display in which a text message is written directly on the tire. A strobe light is mounted for illuminating the tire. The frequency of the strobe light is correlated to the speed of the tire such that the text message is illuminated only in the same readable position during the rotation of the tire. As a result, the text message appears to remain stationary.

There are a number of problems with this approach. First, it is time-consuming to change the text message. In fact, it is impossible to change the text message while the tire is moving. Further, strobe lights are expensive in terms of the power required to provide the illumination, and are also heavy, which is unacceptable in racing contexts.

Other illumination devices exist that partially address the problems raised by the tire flasher display of the above-identified U.S. patent application. However, in a more general sense, the above two problems remain with these prior art devices. That is, with many of the prior art devices, it is time-consuming to change the pattern displayed, and, in fact, is often impossible to change the pattern displayed while the tire is moving. Further, elements must often be mounted off the tire, but adjacent to the tire on the frame of the vehicle, increasing installation time and adding additional weight to the vehicle.

SUMMARY OF THE INVENTION

In accordance with a first aspect of the present invention, there is provided a display apparatus for mounting on a rotatable object. The display apparatus comprises: (a) a display array for displaying at least one display pattern; (b) a self-contained rotational speed sensor for sensing a rotational speed of the rotatable object, the self-contained rotational speed sensor being entirely mounted on the rotatable object; and, (c) a microprocessor for controlling the display array based on the rotational speed of the rotatable object to display the at least one display pattern using persistence of vision of a viewer, the microprocessor being connected to the display device and the speed sensor.

In accordance with a second aspect of the present invention, there is provided a display apparatus for mounting on a rotatable object. The display apparatus comprises: (a) a display device for displaying at least one display pattern; and (b) a wireless receiver for receiving display-timing information for the rotatable object from a signal source spaced from the rotatable object. The display device is operable to display the at least one display pattern based on the display timing information using persistence of vision of a viewer.

In accordance with a third aspect of the present invention, there is provided a method of displaying at least one pattern during rotation of a rotatable object. The method comprises: (a) mounting a display apparatus for displaying the at least one display pattern on the rotatable object, the display apparatus comprising a wireless receiver; (b) determining a rotational speed of the rotatable object; (c) determining a display timing required to display the at least one display pattern on the rotatable object using persistence of vision of a viewer; (d) transmitting one of the display timing and the rotational speed to the wireless receiver; and (e) controlling the display apparatus based on the at least one display pattern and the display timing to display the at least one display pattern using persistence of vision of a viewer.

BRIEF DESCRIPTION OF THE DRAWINGS

These and other advantages of the instant invention will be more fully and completely understood in conjunction with the following detailed description of the preferred aspects of the present invention with reference to the following drawings, in which.

DETAILED DESCRIPTION OF PREFERRED ASPECTS OF THE INVENTION

Figure 1:
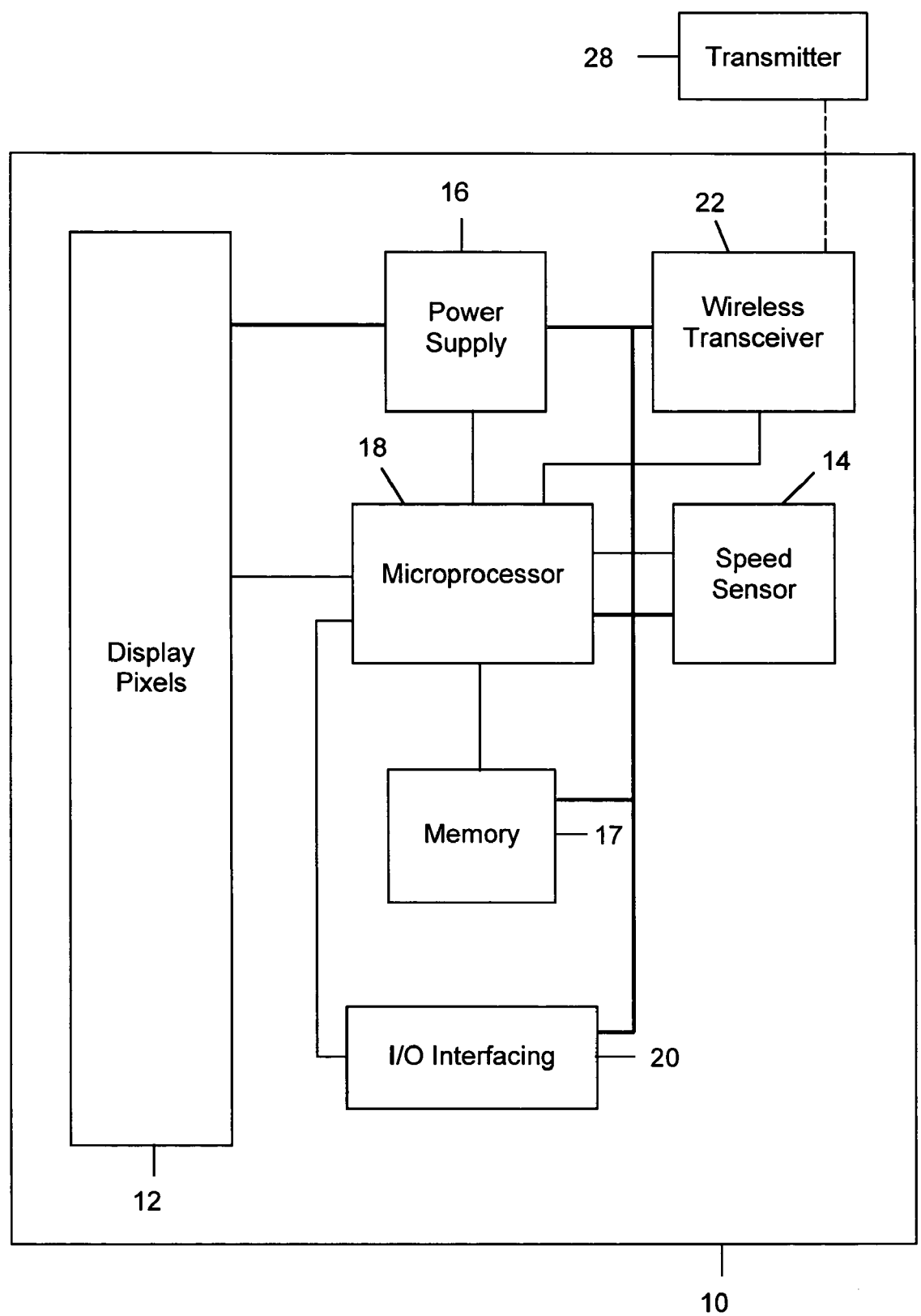
FIG. 1, in a block diagram, illustrates a display apparatus in accordance with an embodiment of the invention.

Referring to FIG. 1, there is illustrated in a block diagram, a display apparatus 10 in accordance with a preferred aspect of the present invention. The display apparatus includes an array of display pixels 12, a power supply 16, a microprocessor 18, and an input/output interfacing module 20. The microprocessor 18 may be driven by software stored on a memory 17. Optionally, the display apparatus 10 may include a speed sensor 14. Also optionally, the display apparatus 10 may include a wireless transceiver 22.

Figure 2:
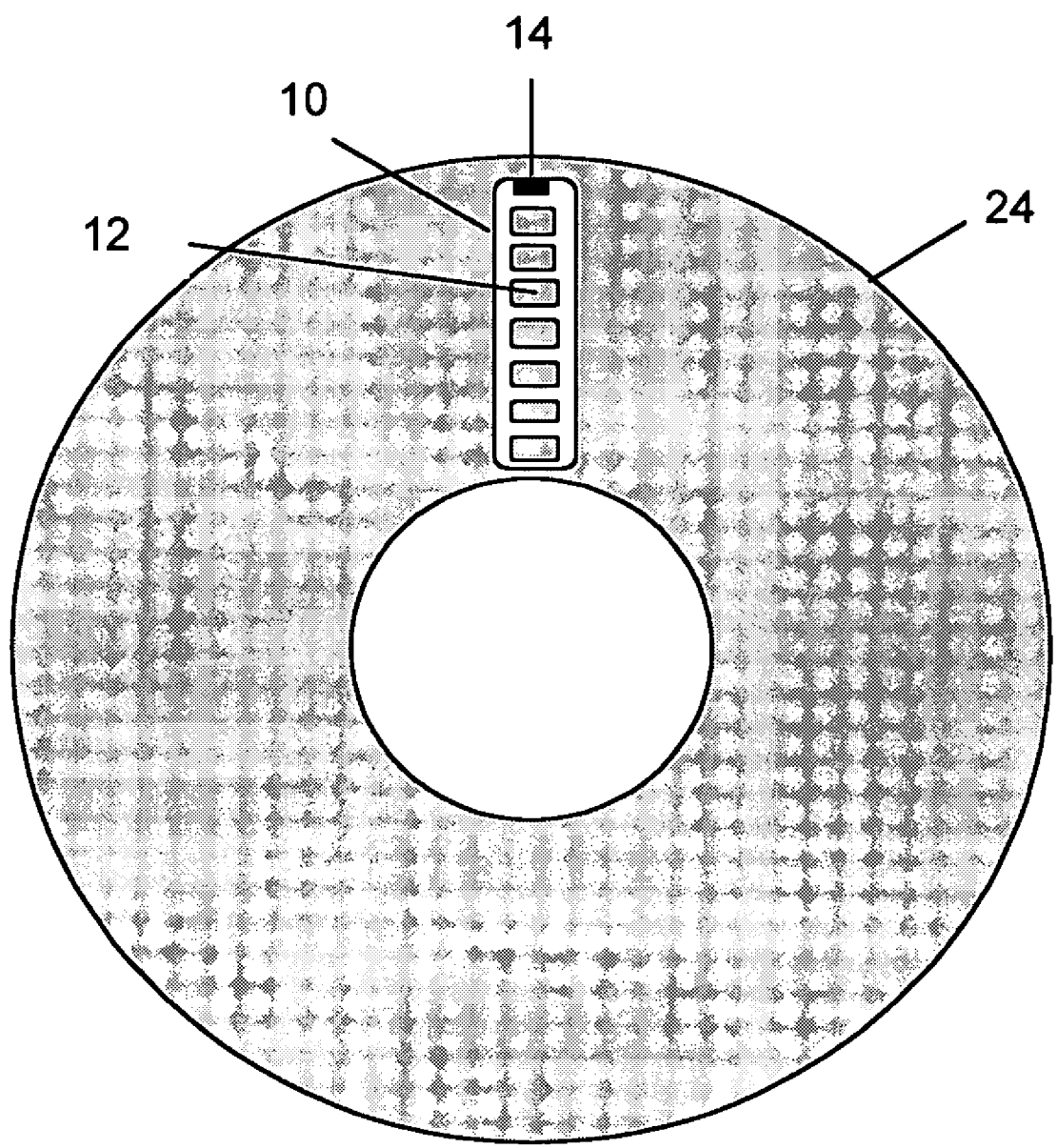
FIG. 2, in a side view, illustrates the display apparatus of FIG. 1 mounted on a tire.
Figure 3:
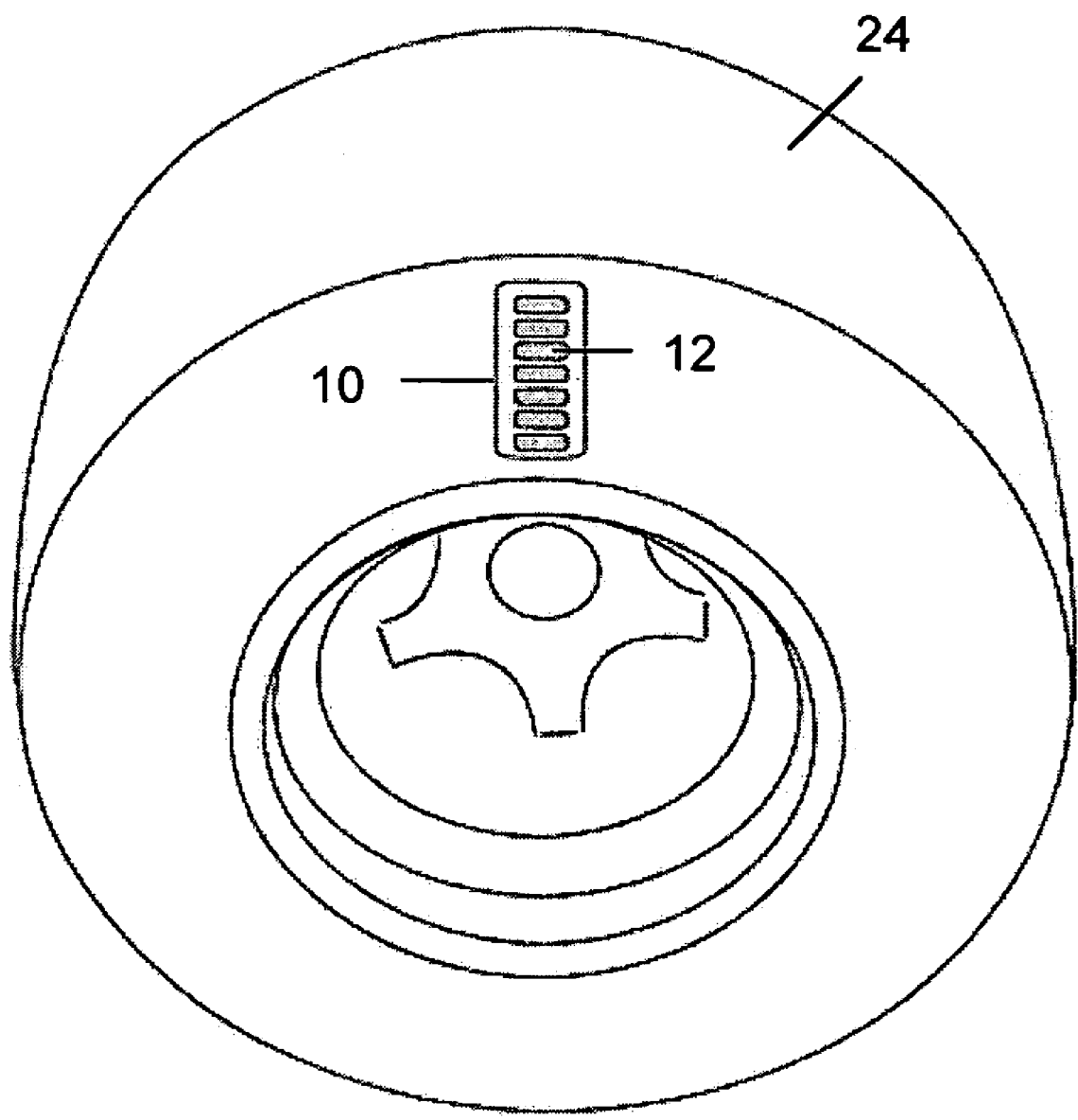
FIG. 3, in a perspective view, illustrates the display apparatus and tire of FIG. 1.

As illustrated in a side view of FIG. 2, and in the perspective view of FIG. 3, the display apparatus 10 is configured to be radially mounted on a tire 24. That is, as shown, the display apparatus 10 is disposed such that the longitudinal dimension of the array of display pixels is radially oriented on the tire. When mounted, the array of display pixels 12 flash on while in a readable position in the top arc of travel of the tire 24 to show text and/or graphics on the tire 24 for spectators to see while the car is moving.

To this end, the illumination of the display pixels 12 must be timed to correspond to the same position—in the top arc of the tire 24—during each rotation of the tire 24. Due to persistence of vision in those viewing the tire, the pattern displayed on the tire 24 will appear to persist, as the frequency with which the pixels are flashing on and off is too high to be captured by the human eye and the location of the pixels from period to period is sufficiently close such that the image appears to be continuous. Using as input the speed or RPM of the tire 24, and based on the display pattern to be displayed by the display pixels 12, the microprocessor 18 determines the timing for illuming each pixel in the array of display pixels 12. The display pattern to be displayed by the display pixels 12 may be stored in the memory 17. Alternatively, an external transmitter 28 can transmit the image to be displayed to the display apparatus 10 via the wireless transceiver 22.

Optionally, the display apparatus 10 includes the speed sensor 14, which determines the speed of the tire 24 and communicates this information to the microprocessor 18. The microprocessor 18 can then determine the timing of the illumination of each pixel in the array of display pixels 12 as described above. The speed sensor 14 is a self-contained speed sensor that does not require any elements external to the display apparatus to determine the speed of the tire 24. For example, the speed sensor may be infrared light-emitting diode (LED) sensor, an ultrasonic sensor, a road pressure/tire deformation sensor or a G-force sensor. Where the speed sensor is an LED sensor, an ultrasonic sensor, or a road pressure/tire deformation sensor, the sensor operates by determining the points at which the ground is closest to the sensor—the time between these points being the time required for the tire to make a single rotation.

Alternatively, display apparatus 10 may omit the speed sensor 14 and instead rely on a wireless transceiver block 22. In this case, speed information can be transmitted to the wireless transceiver block 22 from an external source such as the external transmitter 28. For example, speed information can be transmitted either from an engine computer of the vehicle, or via ground-based telemetry. From the wireless transceiver block 22, the speed information is communicated to the microprocessor 18.

The display pattern or patterns to be displayed by display pixels 12 can be downloaded to the display apparatus 10 via the input/output interfacing module 20. The interfacing module 20 may permit removable connection with a laptop, long range RF communication or short range touch-contact connection. Preferably, however, the interfacing mode selected permits, as long range RF does, the display patterns stored in the memory 17 to be updated while the vehicle is in motion. The elements of display apparatus 10 are powered by power supply 16. Power supply 16 is a self-contained power supply, such as a battery, which may be rechargeable or single use, or by a kinetic power source that generates power from the movement of the wheel.

The pixels of the array of display pixels 12 can be provided by any number of different means known to those of skill in the art. For example, a clear liquid crystal display (LCD) may be used with a bright fluorescent background. When the pixel is off, the LCD would be black. When the pixel is on, the LCD would be clear showing the bright background. Alternatively, a polarized film rotor may be used with a bright fluorescent background. As the polarized film disc rotates at a speed selected by the microprocessor 18 based on the speed of the wheel 24, the pixels will flash on to show the bright background, which has another fixed polarized disc, when the display apparatus 10 is at its top arc of travel, and will flash off at other points. Other alternatives include pixel paper, ultrabright light-emitting diodes (LEDs), tricolor LEDs (for color messages) and graphics display.

Figure 4:
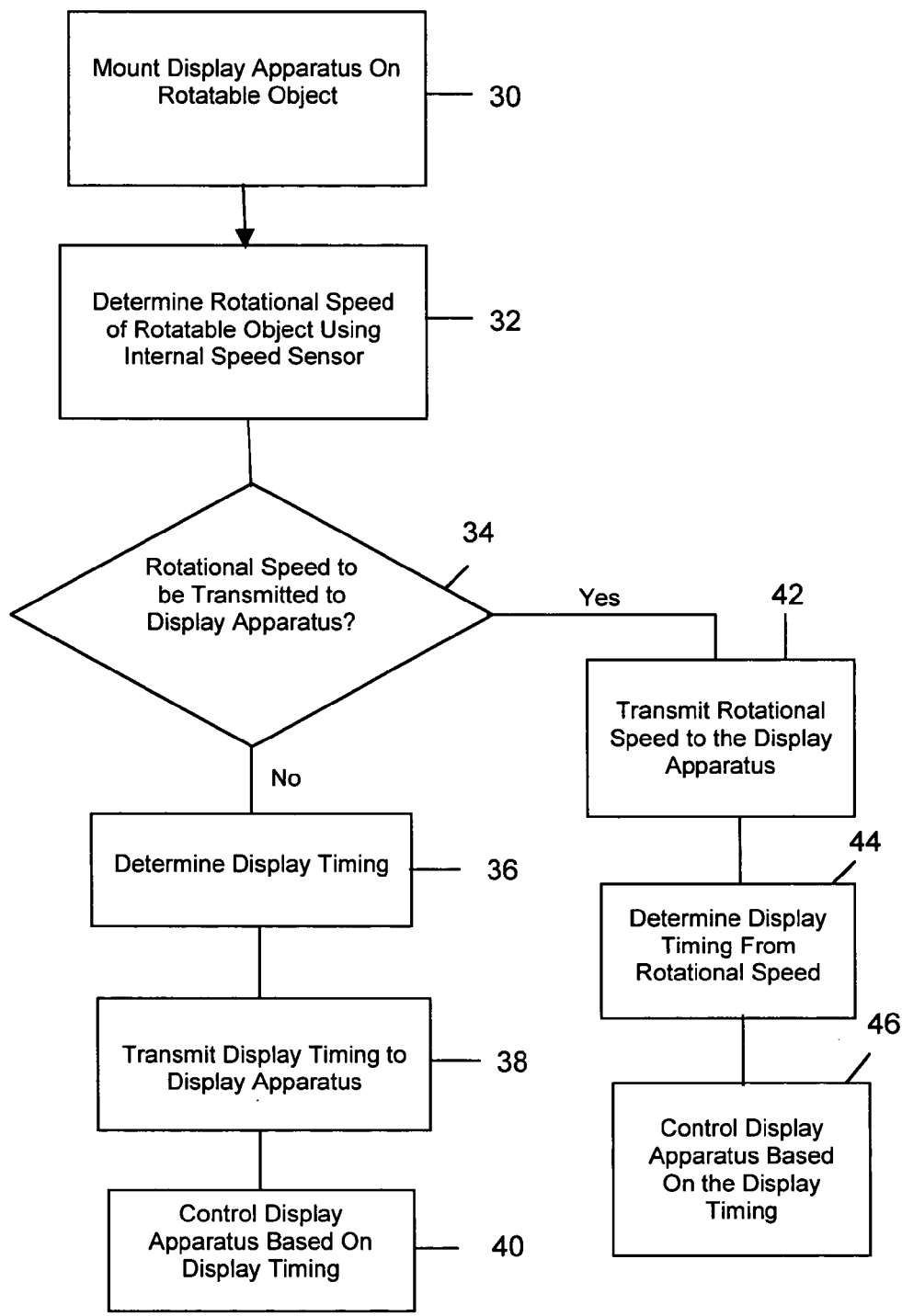
FIG. 4, in a flowchart, illustrates a method for providing an image to the surface of a rotatable object in accordance with a preferred aspect of the present invention.

Referring to FIG. 4, there is illustrated in a flowchart, a method of providing an image to a surface of a rotatable object in accordance with a preferred aspect of the present invention. In step 30 of the method of FIG. 4, a display apparatus for displaying a display pattern on the rotatable object is mounted on the rotatable object. The display apparatus comprises a wireless transceiver. In step 32, a rotational speed of the rotating object is determined. Then the method proceeds to query 34 which queries whether the rotational speed is to be transmitted to the display apparatus. That is, to display the pattern using persistence of vision of a viewer, the timing of the display apparatus in displaying the display pattern on the rotatable object must be correlated with the rotational speed of the rotatable object. This calculation of display timing may occur on, or off, the rotatable object.

If query 34 returns the answer YES, then the display timing is determined off the rotatable object as the display apparatus. Then, in step 36 the display timing required to display the display pattern on the rotatable object using persistence of vision of a viewer is determined by a microprocessor located off the rotatable object. Then, in step 38, the required display timing is transmitted to the wireless transceiver in the display apparatus. In step 40, the display apparatus is controlled based on the display pattern to be displayed and the display timing to display the display pattern using persistence of vision of a viewer.

If query 34 returns the answer NO, then the method proceeds to step 42, in which the rotational speed determined in step 32 is transmitted to the wireless transceiver of the display apparatus mounted on the rotatable object. Then, in step 44, a microprocessor mounted on the rotatable object determines the display timing required to display the display pattern using persistence of vision of the viewer. The method then proceeds to step 46, in which the display apparatus is controlled based on the display pattern and the display timing to display the display pattern using persistence of vision of a viewer.

Other variations and modifications of the invention are possible. For example, while the foregoing has described the invention in the context of a motor vehicle, such as a car, motorcycle or truck, the present invention may also be provided to the wheels of a bicycle, the blades of a windmill, pinwheels or to a soccer ball. All such modifications or variations are believed to be within the sphere and scope of the invention as defined by the claims appended hereto.

The invention claimed is:

1. A method of displaying at least one pattern during rotation of a rotatable object, the method comprising:
    a) mounting a display apparatus for displaying the at least one display pattern on the rotatable object, the display apparatus comprising a wireless receiver;
    b) determining a rotational speed of the rotatable object;
    c) determining a display timing required to display the at least one display pattern on the rotatable object using persistence of vision of a viewer;
    d) transmitting one of the display timing and the rotational speed to the wireless receiver; and
    e) controlling the display apparatus based on the at least one display pattern and the display timing to display the at least one display pattern using persistence of vision of a viewer.

2. The method as defined in claim 1 wherein the display timing is determined from the rotational speed off the rotatable object and then transmitted to the wireless receiver on the rotatable object.

3. The method as defined in claim 1 wherein step (d) precedes step (c), the rotational speed is transmitted to the wireless receiver on the rotatable object and the display timing is determined from the rotational speed by a microprocessor located in the display apparatus on the rotatable object.

4. The method as defined in claim 1 wherein the rotatable object is a tire of a vehicle.

5. The method as defined in claim 4 wherein the display apparatus is radially mounted on the tire.

6. The method as defined in claim 4 wherein step (d) comprises transmitting one of the display timing and the rotational speed to the wireless receiver transceiver from the vehicle.

7. The method as defined in claim 4 wherein step (d) comprises transmitting one of the display timing and the rotational speed to the wireless receiver from a ground-based transmitter external to the vehicle.

8. The method as defined in claim 1 further comprising transmitting the at least one display pattern to the wireless receiver.

9. The method as defined in claim 1 further comprising transmitting the at least one display pattern to the wireless transceiver when the rotatable object is moving.

\* \* \* \* \*